US 6,602,338 B2

(12) United States Patent
Chen et al.

(10) Patent No.: US 6,602,338 B2
(45) Date of Patent: Aug. 5, 2003

(54) TITANIUM DIOXIDE FILM CO-DOPED WITH YTTRIUM AND ERBIUM AND METHOD FOR PRODUCING THE SAME

(75) Inventors: San-Yuan Chen, Hsinchu (TW);
Wen-Feng Hsieh, Taoyuan (TW);
Chu-Chi Ting, Hualien (TW)

(73) Assignee: National Science Council (TW)

( * ) Notice: Subject to any disclaimer, the term of this patent is extended or adjusted under 35 U.S.C. 154(b) by 148 days.

(21) Appl. No.: 09/833,514

(22) Filed: Apr. 11, 2001

(65) Prior Publication Data

US 2002/0056831 A1 May 16, 2002

(30) Foreign Application Priority Data

Sep. 18, 2000 (TW) .......................................... 089119177

(51) Int. Cl.⁷ .............................................. C09K 11/67
(52) U.S. Cl. ............................ 106/287.19; 252/301.4 R
(58) Field of Search ............... 106/287.19; 252/301.4 R (56) References Cited

U.S. PATENT DOCUMENTS 6,093,944 A * 7/2000 VanDover .................... 257/310

OTHER PUBLICATIONS

Zhou, Y. et al., "Fluorescence enhancement of $Er^{3+}$ –doped sol–gel glass by aluminum codoping," Appl. Phys. Lett., 71(5), Aug. 4, 1997, pp. 587–589.

* cited by examiner

*Primary Examiner*—C. Melissa Koslow
(74) *Attorney, Agent, or Firm*—MacPherson Kwok Chen & Heid LLP (57) ABSTRACT

A precursor composition of $TiO_2$ doped with erbium (Er) and yttrium (Y) for forming a film used in a planar optical waveguide amplifier. The precursor composition includes 100 mol % $TiO_2$ precursor compound, about 0.1–10 mol % erbium ion ($Er^{3+}$) precursor compound, and about 1–50 mol % yttrium ion ($Y^{3+}$) precursor compound, thereby forming a doped $TiO_2$ film co-doped with erbium and yttrium an amorphous structure to achieve the enhancing effect on photoluminescence properties.

4 Claims, 6 Drawing Sheets

TITANIUM DIOXIDE FILM CO-DOPED WITH YTTRIUM AND ERBIUM AND METHOD FOR PRODUCING THE SAME

FIELD OF THE INVENTION

The present invention relates to a $TiO_2$ film co-doped with yttrium and erbium and a method for producing the yttrium and erbium co-doped $TiO_2$ film, and more particularly to an yttrium and erbium co-doped $TiO_2$ film used in a planar optical waveguide amplifier.

BACKGROUND OF THE INVENTION

Owing to the development of network communication, the loading of the network information transference is heavier and heavier. For increasing the data capacity carried by the transform system, the optical fiber system is applied in the communication system for satisfying the demand.

The most important elements of the optical communication system are light source and optical-guided medium. Owing to the disclosure of the semiconductor laser, the long effect and stable light source can be practically applied. At the same time, the quartz optical fiber having low transmission loss has been developed. However, during optical fiber transmission, the transmission loss is inevitable. Thus, it is necessary to set an amplifier at the intermediate station for a long distance transmission. Traditionally, the amplifier is used to transfer an optical signal to an electrical signal, amplify the electrical signal, transfer the amplified electrical signal to the amplified optical signal, and transmit out the amplified optical signal. After the disclosure of the erbium-doped fiber amplifier (EDFA), however, the optical signal can be directly amplified and transmitted out.

During the light transmission, the light source having a wavelength of 1.53 μm has lower loss and is harmless for human eyes. When erbium ion is excited by the laser with the wavelength of 1.48 μm, 0.98 μm or 0.8 μm, the electron located on the first exciting state will jump back to the ground state and irradiate an infrared ray with wavelength of 1.53 μm. The infrared spectra are the light source applied in the current optical fiber communication.

Currently, along the development and upgrade of the IC semiconductor producing technology, the microphotoelectromechanic system is quickly developed. For the integrated optics devices, the planar optical amplifier has very important applications. Furthermore, because the size of the planar optical amplifier is much smaller than that of the erbium-doped fiber amplifier, the erbium-doped planar optical waveguide amplifier becomes an important issue in the integrated optics. Referring to the erbium-doped planar optical waveguide amplifier, most researches are focus on either the process improvement or the different host selection. Generally, the major material of the host is oxide glass, such as pure silica, soda-lime silicate, phosposilicate and aluminosilicate glass, because the oxide glass is the major material for current optical fibers. However, the ceramics material such as $Al_2O_3$, $TiO_2$, $Y_2O_3$ and $LiNbO_4$, or the amorphous silicon material are also used to be the host. The shape and intensity of erbium-ion fluorescence spectrum are affected by different host. Furthermore, the fluorescence spectral characteristics are dependent on the solubility, or the radiative/non-radiactive relaxation of the erbium ion in the host.

The cross-relaxation between erbium ions will decrease the number of excited erbium ion. The cross-relaxation strength between erbium ions is dependent on the distance between the erbium ions. That is, while the clustering effect of erbium ions increases, the photoluminescence efficiency decreases. In addition, a hydroxide group is a photoluminescence quenching center because the second harmonic vibration of the hydroxide group can produce resonant effect with the photoluminescence at the wavelength about 1.54 μm of erbium ion, which results in the photoluminescence efficiency decreasing. Moreover, the up-conversion phenomenon caused by the cross-relaxation effect between erbium ions will also decrease the photoluminescence efficiency. Therefore, the photoluminescence efficiency can be improved by increasing the erbium ion solubility in host, decreasing the hydroxide group content in host, or decreasing the probability of the up-conversion, and more especially by increasing the erbium ion solubility in host. Generally, the aluminum ion is doped into the silicon oxide structure for increasing the erbium ion solubility because the aluminum ion can be a network former and a network modifier to break the tetrahedron network structure of silicon oxide. Thus, the number of non-bridging oxygen is increased, which further increases the erbium ion solubility.

Another way to increase photoluminescence efficiency is basically to change host materials because the erbium ion solubility in host is strongly host-dependent. Thus, a proper host can increase the erbium ion solubility and further increase the photoluminescence efficiency. Since $TiO_2$ host has higher refraction index (n=2.52 for anatase and n=2.76 for rutile), the optical modes are increased for enhancing transmission efficiency and decreasing the bending radii of the optical waveguide. Hence, the size of optical waveguide device is largely decreased. In addition, $TiO_2$ host also has lower phonon energy ($<700$ $cm^{-1}$), so the excited electrons are decreased by non-radiative losing rate.

Therefore, $Er^{3+}$-doped $TiO_2$-based film is applied in the planar optical waveguide amplifier. However, the photoluminescence properties of $Er^{3+}$-doped $TiO_2$ film applied in the planar optical waveguide amplifier are not as good as expectation.

Therefore, the purpose of the present invention is to develop a material and a method to deal with the above situations encountered in the prior art.

SUMMARY OF THE INVENTION

It is therefore an object of the present invention to propose an erbium and yttrium co-doped $TiO_2$ material and a method for producing the erbium and yttrium co-doped $TiO_2$ film used in a planar optical waveguide amplifier for increasing photoluminescence at the wavelength about 1.54 μm in emissive intensity.

It is therefore another object of the present invention to propose an erbium and yttrium co-doped $TiO_2$ material and a method for producing the erbium and yttrium co-doped $TiO_2$ film used in a planar optical waveguide amplifier for increasing photoluminescence at the wavelength about 1.54 μm in bandwidth.

It is therefore an additional object of the present invention to propose an erbium and yttrium co-doped $TiO_2$ material and a method for producing the erbium and yttrium co-doped $TiO_2$ film used in a planar optical waveguide amplifier for decreasing light scattering.

It is therefore an additional object of the present invention to propose an erbium and yttrium co-doped $TiO_2$ material and a method for producing the erbium and yttrium co-doped $TiO_2$ film used in a planar optical waveguide amplifier for decreasing processing temperature and further reducing the producing cost.

According to one aspect of the present invention, there is provided a doped $TiO_2$ material for forming a film used in a planar optical waveguide amplifier. The doped $TiO_2$ material includes 100 mol % $TiO_2$ precursor compound, about 0.1–10 mol % erbium ion ($Er^{3+}$) precursor compound, and about 1–50 mol % yttrium ion ($Y^{3+}$) precursor compound, thereby forming the doped $TiO_2$ film co-doped with erbium and yttrium as an amorphous structure to achieve the enhancing effect on photoluminescence properties.

Preferably, the erbium ion ($Er^{3+}$) precursor compound is selected from a group consisting of erbium acetate, erbium carbonate, erbium chloride, erbium oxalate, erbium nitrate, and erbium isopropoxide.

Preferably, the $TiO_2$ precursor compound is selected from a group consisting of titanium isopropoxide, titanium ethoxide, titanium chloride, and titanium butoxide.

Preferably, the yttrium ion ($Y^{3+}$) precursor compound is selected from a group consisting of yttrium acetate, yttrium carbonate, yttrium chloride, yttrium oxalate, yttrium nitrate, and yttrium isopropoxide.

According to another aspect of the present invention, there is provided a method for forming a doped $TiO_2$ film used in a planar optical waveguide amplifier. The method includes steps of (a) preparing a titanium solution having 100 mol % titanium ion ($Ti^{4+}$) precursor compound, (b) preparing a yttrium solution having the concentration about 1–50 mol % yttrium ion ($Er^{3+}$) precursor compound, (c) adding the yttrium solution and an erbium powder with the concentration about 0.1–20 mol % into the titanium solution for forming a sol-gel solution and (d) forming the $TiO_2$ film co-doped with $Er^{3+}$ and $Y^{3+}$ by spin-coating and thermal treatment.

Certainly, the step (a) can further include steps of (a1) dissolving titanium isopropoxide in acetic acid to from a first solution and (a2) adding 2-methoxyethanol into the first solution.

Certainly, the step (b) can further include step of dissolving yttrium acetate in a mixed solution of methanol and ethylene glycol.

Preferably, the step (d) further includes steps of (d1) spin-coating the sol-gel solution on a substrate, (d2) thermal treating the substrate at a first specific temperature for evaporating organic materials thereof, (d3) repeating steps of spin-coating and thermal treating until the film reaching a specific thickness and (d4) thermal treating the film of the substrate at a second specific temperature for forming the $TiO_2$ film co-doped with $Er^{3+}$ and $Y^{3+}$.

Certainly, the substrate can be made of a material selected from a group consisting quartz, glass, and silica oxide on silicon (SOS).

Preferably, the first specific temperature is about 400° C. and the second specific temperature is ranged from 500 to 900° C.

Preferably, the specific thickness of the film is ranged from 0.1 to 2 $\mu$m.

The present invention may best be understood through the following description with reference to the accompanying drawings, in which:

DETAILED DESCRIPTION OF THE PREFERRED EMBODIMENTS

The present invention discloses a $TiO_2$ host co-doped with erbium and yttrium to form a $TiO_2$ film. Owing to the presence of yttrium ion, the erbium and yttrium co-doped $TiO_2$ film has 10 times about 1.54 $\mu$m photoluminescence intense emission and 1.5 times bandwidth of fluorescence spectrum than the erbium and aluminum co-doped $TiO_2$ film has, which is thought a material having excellent photoluminescence property. In addition, the erbium and yttrium co-doped $TiO_2$ film requires lower processing temperature and lower producing cost, so it is a potential material used in the planar optical waveguide amplifier of the integrated optics.

The preparation of the erbium and yttrium co-doped $TiO_2$ film material is performed by the sol-gel spin coating process. First, a $Er^{3+}$ precursor such as erbium acetate and a $Y^{3+}$ precursor such as yttrium acetate are added into a $Ti^{4+}$ precursor such as titanium isopropoxide to form a clear solution, wherein the ratio of $Er^{3+}$: $Y^{3+}$: $Ti^{4+}$ is represented as X: Y: 1 (mol). Subsequently, the clear solution is applied with spin coating and thermal treatment to obtain a $TiO_2$ amorphous structure co-doped with high concentrations of erbium and yttrium.

Referring to the preparation of the sol-gel solution, first, titanium isopropoxide is dissolved into an acetate solution. After stirring, 2-methoxyethanol is added and is agitated violently. On the other hand, yttrium acetate is added into a methanol/ethylene glycol solution with a molar ratio of 3:1. A certain ratio erbium acetate powder and the above yttrium acetate solution are added into the titanium isopropoxide solution together. Then, the mixture solution is agitated for at least 10 hours in order to process homogenous hydrolysis and condensation reaction among titanium, erbium and yttrium ions.

Regarding to the preparation of the film, first of all, the sol-gel solution is homogenously sputtered on a fused quartz substrate and spin-coated at a speed of 4000 rpm/30 sec. After coating, each layer of the film is dried 150° C. on a hot plate for evaporating the solvent. Then, the film is treated at 400° C. for 30 minutes at a heating rate of 5° C./mm to remove the remained organic material of the film. The spin-coating and annealing steps are repeated until the 0.5 $\mu$m thickness of film is deposited. Then, the film is treated at the temperature ranged from 600 to 1000° C. for 1 hour at a heating rate of 10° C./mm. Table 1 shows the full width at half maximum (FWHM) of photoluminescence of film samples at the wavelength about 1.54 μm with different molar ratio of erbium/yttrium/titanium and erbium/aluminum/silicon, wherein the Er:Al:Si ratio of samples E and F are formed the best compositions having the most intense photoluminescence according to Y. Zhou's paper published in Applied Physical Letters, vol.71, p587–589 at 1997.

TABLE 1

The FWHM of photoluminescence in film samples at the wavelength about 1.54 μm of different ratio erbium/yttrium/titanium and erbium/aluminum/silicon.

| Sample | A | B | C | D | E | F |
|---|---|---|---|---|---|---|
| Er:Y:Ti (mol %) | 5:0:100 | 5:10:100 | 5:30:100 | 10:30:100 | — | — |
| Er:Al:Si (mol %) | — | — | — | — | 0.7:0:100 | 0.7:8:100 |
| FWHM of PL at the wavelength about ~1.54 μm (nm) | 13 | 36 | 75 | 75 | 27 | 50 |

Figure 1:
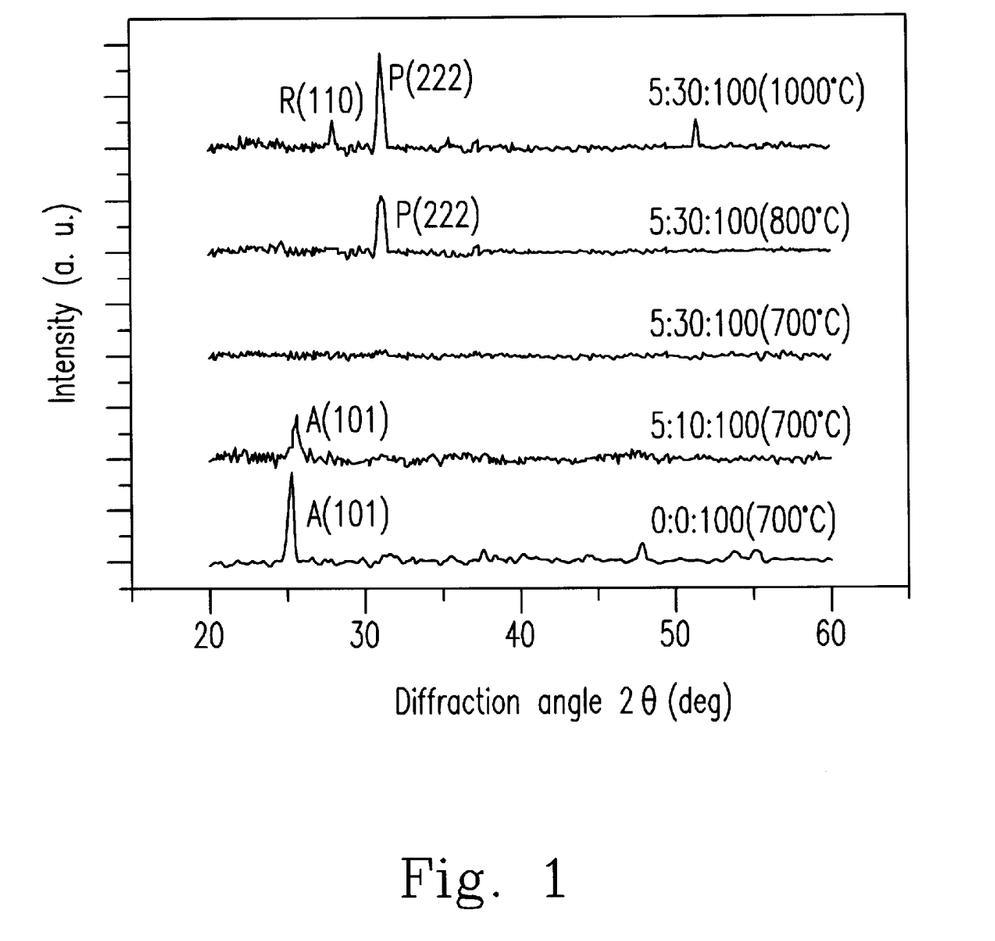
FIG. 1 is a plot illustrating X-ray diffraction patterns of different ratio $Er_2O_3$: $Y_2O_3$: $TiO_2$ films treated at different temperature for 1 hour, wherein A, R, and P represent anatase, rutile, and pyrochlore phase respectively.

FIG. 1 is a plot illustrating X-ray diffraction (XRD) patterns of different ratio $Er_2O_3$: $Y_2O_3$: $TiO_2$ films treated at different temperature for 1 hour, wherein A, R, and P represent anatase, rutile, and pyrochlore phase respectively. As a pure $TiO_2$ film ($Er_2O_3$: $Y_2O_3$: $TiO_2$=0:0:100) is annealed at 700° C., an anatase phase 101 is observed. However, with the incorporation of 5 mol % $Er^{3+}$ and 10 mol % $Y^{3+}$ into $TiO_2$ network, the XRD peak of $TiO_2$ phase was broadened, indicating the crystallinity of matrix host becomes poor. Furthermore, as increasing the doping concentration of $Y^{3+}$ to 30 mol %, a weak broad continuum in the XRD was observed, which is characteristic of amorphous structure. Thus, while $Er^{3+}$ or $Y^{3+}$ are added into $TiO_2$ network, the crystallinity of $TiO_2$ (i.e. anatase phase) will significantly decrease. While the annealing temperature is 800° C. and the ratio of $Er_2O_3$: $Y_2O_3$: $TiO_2$ is 5:30:100, a strong preferred peak 222 is observed, demonstrating a pyrochlore phase with the formula of $Er_xY_{2-x}Ti_2O_7$ is developed in the $TiO_2$-based amorphous structure. While the annealing temperature is 1000° C., another weak peak 110 is observed, demonstrating a rutile phase is developed in the $TiO_2$-based amorphous structure.

Figure 2:
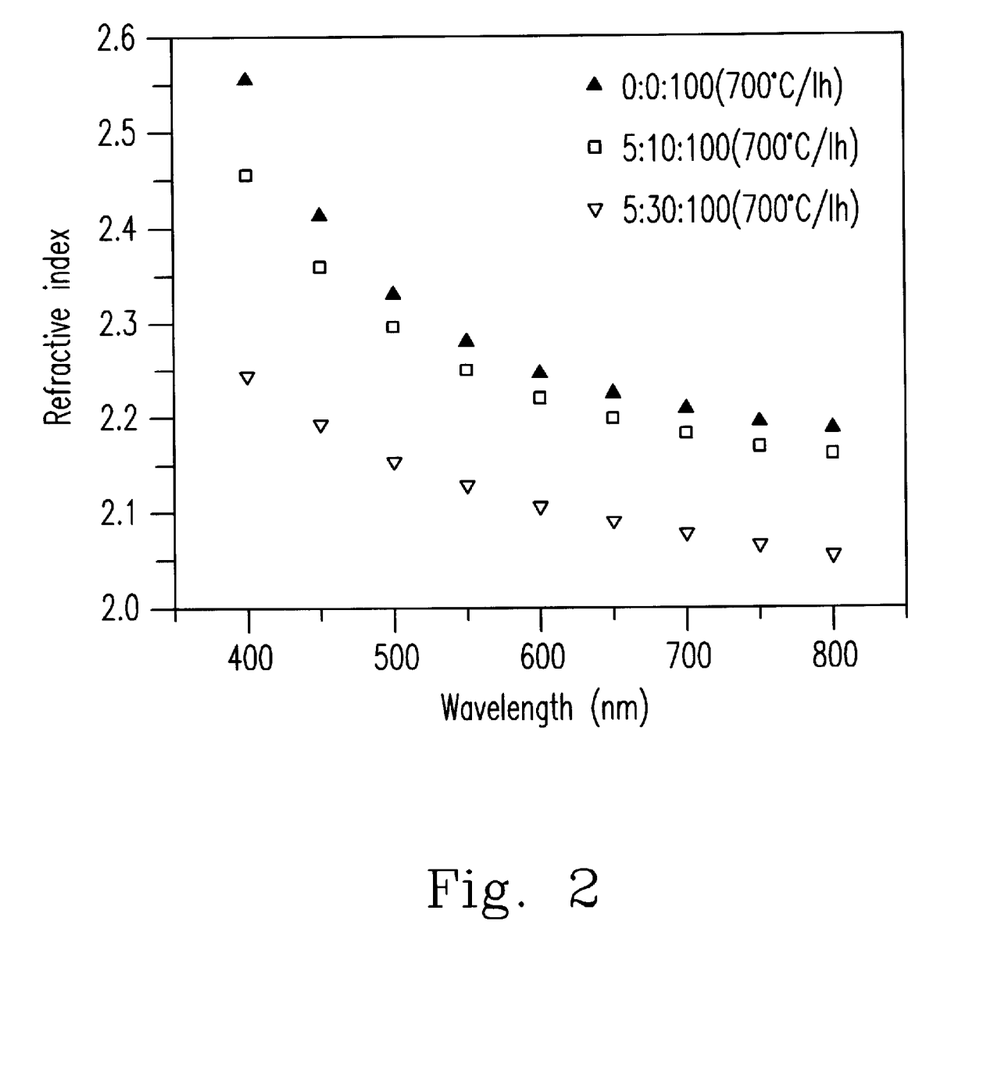
FIG. 2 is a plot illustrating chromatic dispersion curve of different ratio $Er_2O_3$: $Y_2O_3$: $TiO_2$ films treated at 700° C. for 1 hour according to the present invention.

FIG. 2 is a plot illustrating chromatic dispersion curve of different ratio $Er_2O_3$: $Y_2O_3$: $TiO_2$ films treated at 700° C. for 1 hour according to the present invention. As shown in FIG. 2, a pure $TiO_2$ film ($Er_2O_3$: $Y_2O_3$: $TiO_2$=0:0:100) is annealed at 700° C. for 1 hour, the refractive index of the $TiO_2$ film is 2.28. While the $TiO_2$ film is co-doped with 5 mol % $Er^{3+}$ and 10 mol % or 30 mol % $Y^{3+}$, the refractive indexes decrease from 2.28 to 2.25 and from 2.28 to 2.13. Thus, according to the change of $Y^{3+}$ concentration, the preparation of an $Er^{3+}$ and $Y^{3+}$ co-doped $TiO_2$ film with flexible refractive index can be achieved.

Figure 3:
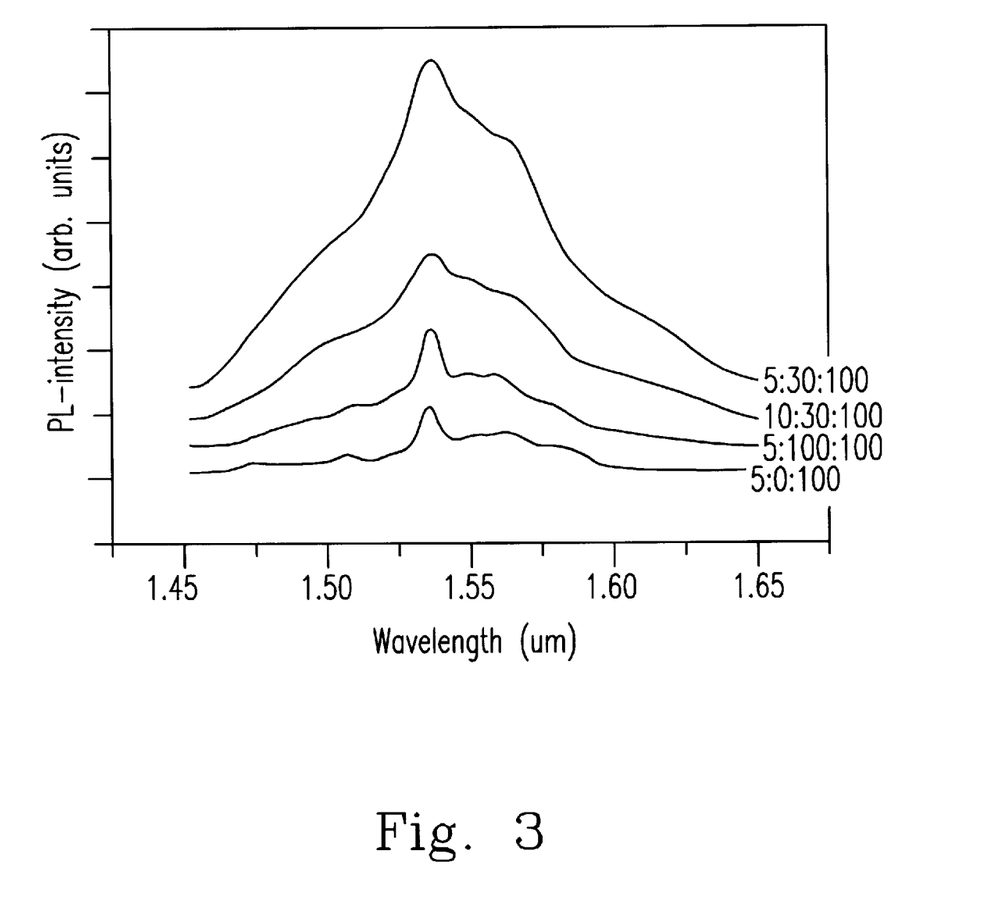
FIG. 3 is a plot illustrating the fluorescence spectra at the wavelength about 1.54 $\mu$m of different ratio $Er_2O_3$: $Y_2O_3$: $TiO_2$ films treated at 700° C. for 1 hour according to the present invention.

As shown in FIG. 3, while the $Er^{3+}$ doping concentration is 5 mol %, once the addition of $Y^{3+}$ concentration reaches above 20 mol %, the intensity increases about 3–4 times and the bandwidth increases from 35 nm to 75 nm at the photoluminescence intensity at the wavelength about 1.54 μm.

Figure 4:
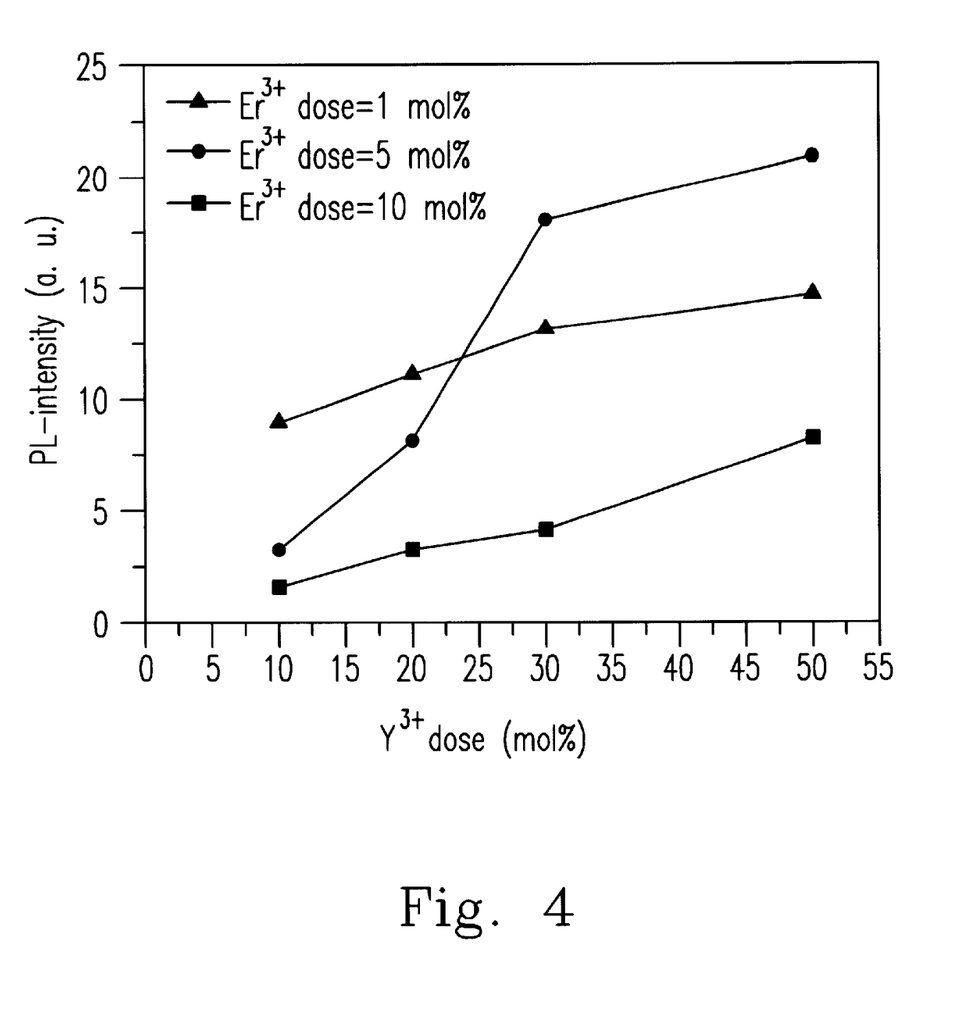
FIG. 4 is a plot illustrating the photoluminescence intensities at the wavelength about 1.54 $\mu$m of the erbium and yttrium co-doped $TiO_2$ film treated at 700° C. for 1 hour with different $Er^{3+}$ and $Y^{3+}$ concentrations according to the present invention.
Figure 5:
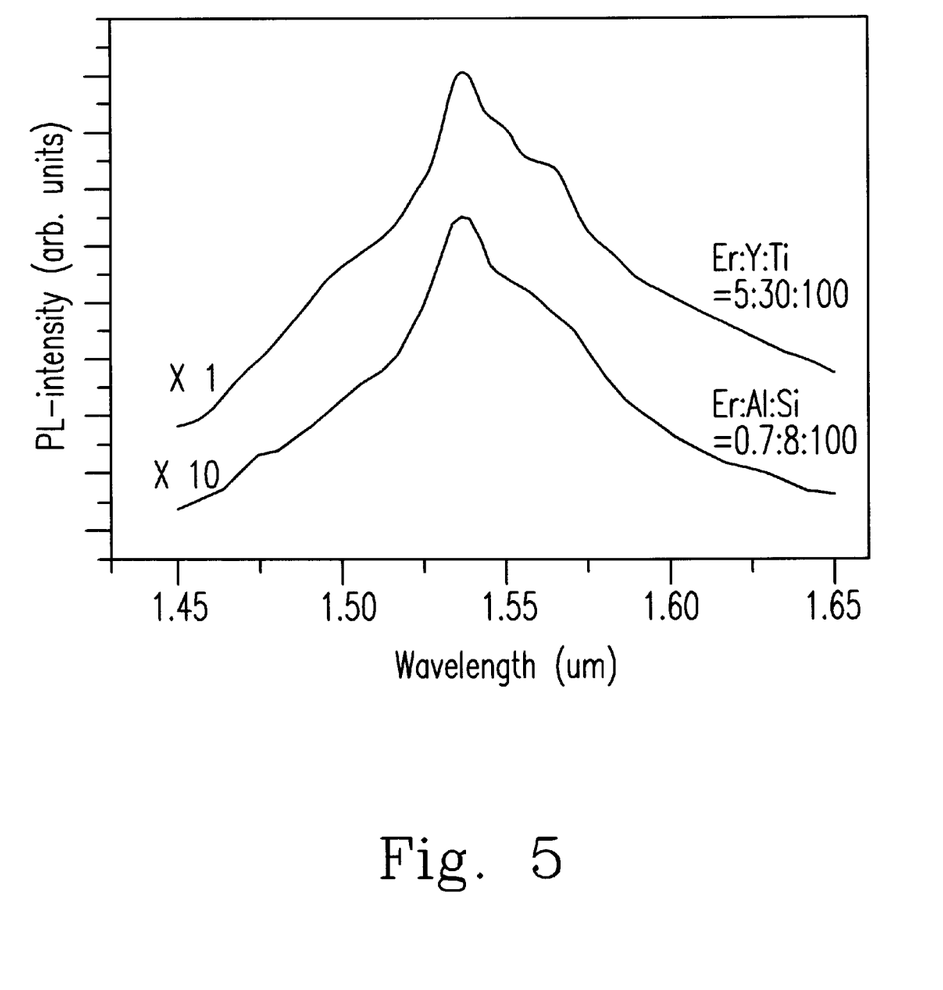
FIG. 5 is a plot illustrating the fluorescence spectra at the wavelength about 1.54 $\mu$m of the erbium and yttrium co-doped $TiO_2$ film treated at 700° C. for 1 hour and the best ratio of erbium and aluminum co-doped $TiO_2$ film with the best molar ratio and treated at 700° C. for 1 hour according to the present invention.

As shown in FIG. 4, the more $Y^{3+}$ is doped into the host, the stronger the photoluminescence intensity at the wavelength about 1.54 μm is, even though the $Er^{3+}$ doping concentrations are different in the host (1, 5, and 10 mol %). In addition, FIG. 5 shows that the Er and $Y^{3+}$ co-doped $TiO_2$ film according to a preferred sample of the present invention has 10 times for photoluminescence intensity and 1.5 times for bandwidth than of the $Er^{3+}$ and $Al^{3+}$ co-doped silica film with an optical molar ratio of 0.7:8:100 has. Therefore, the photoluminescence properties of the $Er^{3+}$ and $Y^{3+}$ co-doped $TiO_2$ film has more intense emission and wider bandwidth while comparing with that of the pure $TiO_2$ film or that of the $Er^{3+}$ and $Al^{3+}$ co-doped silica film.

Figure 6:
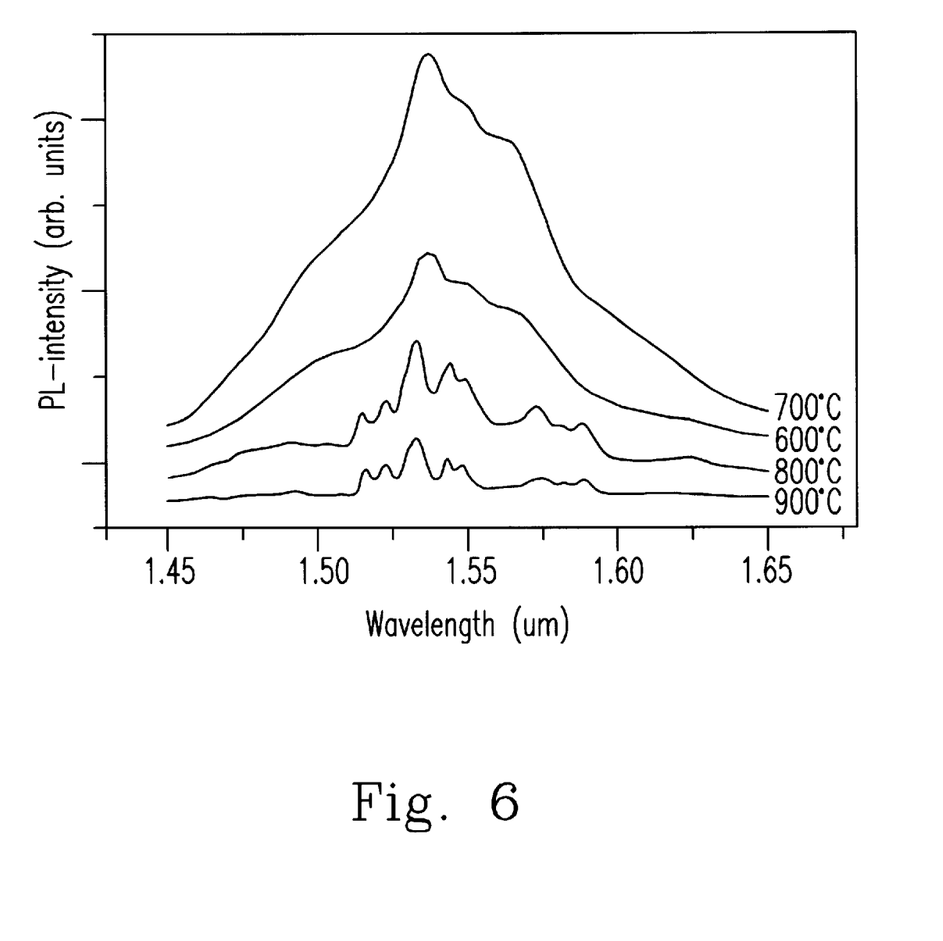
FIG. 6 is a plot illustrating the fluorescence spectra at the wavelength about 1.54 $\mu$m of the erbium and yttrium co-doped $TiO_2$ film treated at different temperature ranged from 700 to 900° C. for 1 hour according to the present invention.

FIG. 6 illustrates the photoluminescence intensity of the $Er^{3+}$ and $Y^{3+}$ co-doped $TiO_2$ film treated at the different annealing temperatures. The result shows the intensity of $Er^{3+}$ and $Y^{3+}$ co-doped $TiO_2$ film increases with the increasing temperature when the temperature is not more than 700° C. However, the spectrum of $Er^{3+}$ and $Y^{3+}$ co-doped $TiO_2$ film is not significantly changed at this condition. Once the annealing temperature increases to or over 800° C., the photoluminescence intensity decreases and the spectrum is divided into several small peaks as shown in FIG. 6.

The present invention provides an $Er^{3+}$ and $Y^{3+}$ co-doped $TiO_2$ film and a method for producing the same. The $TiO_2$ film co-doped with 5 mol % $Er^{3+}$ and more than 30 mol % $Y^{3+}$ and annealed at 700° C. has the best photoluminescence properties when the $Er^{3+}$ and $Y^{3+}$ co-doped $TiO_2$ film is applied in the planar optical waveguide amplifier. Therefore, the present invention has the following advantages: doped TiO2 film is applied in the planar optical waveguide amplifier. Therefore, the present (1) The $Er^{3+}$ and $Y^{3+}$ co-doped $TiO_2$ film has 4 times for photoluminescence intensity at the wavelength about 1.54 μm and 2 times for bandwidth than the $Er^{3+}$ doped $TiO_2$ film has.

(2) When comparing with a typical $Er^{3+}$ and $Al^{3+}$ co-doped silica film used in the planar optical waveguide amplifier, the $Er^{3+}$ and $Y^{3+}$ co-doped $TiO_2$ film has 10 times for photoluminescence intensity at the wavelength about 1.54 μm, 1.5 times for bandwidth, and 1.3 times for refraction. Therefore, an amplifier device produced by the $Er^{3+}$ and $Y^{3+}$ co-doped $TiO_2$ film has higher efficiency and smaller size.

(3) The $Er^{3+}$ and $Y^{3+}$ co-doped $TiO_2$ film has an amorphous structure, so the light scattering can be decreased.

(4) The temperature of thermal treatment is about 700° C. that is much lower than the typical processing temperature for the $Er^{3+}$ and $Al^{3+}$ co-doped silica film, so the present invention can decrease largely the processing temperature and further reduce the producing cost. In addition, the lower temperature is more properly applied in the planar optical waveguide amplifier because the typical quartz substrate cannot endure higher temperature in the process.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A precursor composition of TiO2 doped with erbium (Er) and yttrium (Y) for forming a film used in a planar optical waveguide amplifier, comprising:

100 mol % $TiO_2$ precursor compound;

about 0.1–10 mol % erbium ion ($Er^{3+}$) precursor compound; and about 1–50 mol % yttrium ion ($Y^{3+}$) precursor compound;

thereby forming a doped $TiO_2$ film co-doped with erbium and yttrium as an amorphous structure to achieve the enhancing effect on photoluminescence properties.

2. The precursor composition according to claim 1, wherein said erbium ion ($Er^{3+}$) precursor compound is selected from a group consisting of erbium acetate, erbium carbonate, erbium chloride, erbium oxalate, erbium nitrate, and erbium isopropoxide.

3. The precursor composition according to claim 1, wherein said $TiO_2$ precursor compound is selected from a group consisting of titanium isopropoxide, titanium ethoxide, titanium chloride, and titanium butoxide.

4. The precursor composition according to claim 1, wherein said yttrium ion ($Y^{3+}$) precursor compound is selected from a group consisting of yttrium acetate, yttrium carbonate, yttrium chloride, yttrium oxalate, yttrium nitrate, and yttrium isopropoxide.

* * * * *